(12) United States Patent
Dewald

(10) Patent No.: US 7,537,347 B2
(45) Date of Patent: May 26, 2009

(54) METHOD OF COMBINING DISPERSED LIGHT SOURCES FOR PROJECTION DISPLAY

(75) Inventor: Duane Scott Dewald, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 429 days.

(21) Appl. No.: 11/288,679

(22) Filed: Nov. 29, 2005

(65) Prior Publication Data

US 2007/0121085 A1     May 31, 2007

(51) Int. Cl.
*G03B 21/14* (2006.01)
(52) U.S. Cl. .......................... 353/38; 353/94; 362/561; 362/244
(58) Field of Classification Search .................. 353/102, 353/97, 94, 85–87, 119, 20, 122; 349/69, 349/62; 348/798–803; 362/559–561, 555
See application file for complete search history.

(56) References Cited

U.S. PATENT DOCUMENTS

| | | | |
|---|---|---|---|
| 6,318,863 B1 * | 11/2001 | Tiao et al. ..................... 353/31 |
| 6,547,400 B1 * | 4/2003 | Yokoyama .................... 353/98 |
| 7,192,140 B2 * | 3/2007 | Hosaka ......................... 353/31 |
| 7,234,820 B2 * | 6/2007 | Harbers et al. ................ 353/94 |
| 7,261,453 B2 * | 8/2007 | Morejon et al. ............. 362/555 |
| 7,318,644 B2 * | 1/2008 | Abu-Ageel .................. 353/20 |
| 2004/0057027 A1 * | 3/2004 | Tani ........................... 353/102 |
| 2005/0122487 A1 * | 6/2005 | Koyama et al. ............... 353/94 |
| 2005/0259229 A1 * | 11/2005 | Lee et al. ...................... 353/94 |

* cited by examiner

*Primary Examiner*—William C Dowling
(74) *Attorney, Agent, or Firm*—Charles A. Brill; Wade James Brady, III; Frederick J. Telecky, Jr.

(57) ABSTRACT

A method and system for combining light emitted by dispersed light sources for use in a projection display or similar system. A plurality of elongated and tapered light integrators are placed side by side forming an array, each having at their small input end a light source, such as an LED. Light collimated by each light integrator is further collimated by a convex lens disposed immediately at the output end of the light integrator. From the convex lenses, the light falls upon an array integrator, preferably a fly-eye type integrator, and passes through it to a second array integrator. Light emerging from the second array integrator is then passed through one or more relay lenses and falls upon a light modulator, such as a digital mircomirror device (DMD). The modulated light beam then passes through a projection lens and onto a visual image display screen. The display screen may, for example, be the screen of a high definition television (HDTV).

15 Claims, 6 Drawing Sheets

METHOD OF COMBINING DISPERSED LIGHT SOURCES FOR PROJECTION DISPLAY

TECHNICAL FIELD

The present invention relates generally to optical display systems, and more particularly to a method and system for combining the light emitted by advantageously dispersed light sources, such as LEDs, for use in projection display systems.

BACKGROUND

Spatial light modulation (SLM) display systems are visual display systems that are used as an alternative to conventional cathode-ray tube (CRT) systems. SLM systems are used in a variety of applications such as television screens. One type of SLM may be referred to as a projection display system. Due to their superior clarity and performance, they are often used in high-end applications such as high-definition television (HDTV). Projection display systems transmit light produced by one or more light sources to create the display on a display screen. One popular projection display system is commercially available as DLP® (or Digital Light Processing®). DLP® utilizes a digital micromirror device (DMD), an array of thousands of tiny mirrors to properly reflect light from the light source to produce the image for display. One example of a DMD-based projection display system is illustrated in FIG. 1.

FIG. 1 is a simplified configuration diagram illustrating selected components of an exemplary projection display system 10. The display system 10 includes various components that define an optical path 5 between light source 11 and display screen 19. Light source 11 may be, for example, an ultra-high pressure (UHP) arc lamp. Display screen 19, which may be an HDTV screen, presents the visual image display intended to be seen by the viewer. The remaining components are mounted within an appropriate housing (not shown). In operation, light emitted from the light source 11 is applied through a first condenser lens 12 and then through a rotating color wheel 13. Color wheel 13 will typically rotate at least once per frame (of the image to be displayed). The light passing through the color wheel 13 next passes through a second condenser lens 14 before illuminating DMD chip 15. It is chiefly DMD chip 15 that modulates the light traveling through optical path 5 to produce a visual image.

To accomplish this, the DMD chip 15 includes an array of tiny mirror elements, or micromirrors (typically on the order of one million of them). Each mirror element is separately controllable. For example, they may be mounted on a torsion hinge and support post above a memory cell of a CMOS static RAM as shown in FIG. 2. FIG. 2 shows a portion of a typical DMD chip 15 having mirror elements 21 suspended over a substrate 23. Electrostatic attraction between the mirror 21 and an address electrode 25 causes the mirror to twist or pivot, in either of two directions, about an axis formed by a pair of torsion beam hinges 27a and 27b. Typically, the mirror rotates about these hinges until the rotation is mechanically stopped. The movable micromirror tilts into the on or off states by electrostatic forces depending on the data written to the cell. The tilt of the mirror is on the order of plus 10 degrees (on) or minus 10 degrees (off) to modulate the light that is incident on the surface.

The DMD's are controlled by electronic circuitry (not shown) that has been fabricated on the silicon substrate 23 and is generally disposed under the DMD mircromirror array. The circuitry includes an array of memory cells (also not shown), typically one memory cell for each DMD element, connected to the address electrodes 25. The output of a memory cell is connected to one of the two address electrodes and the inverted output of a memory cell is connected to the other address electrode.

The operation data is provided by a timing and control circuit 17 as determined from signal processing circuitry according to an image source 16 (as shown in FIG. 1). Once data is written to each memory cell in the array, a voltage is applied to the individual DMD mirrors 21 creating a large enough voltage differential between the mirrors 21 and the address electrodes 25 to cause the mirror to rotate or tilt in the direction of the greatest voltage potential. Since the electrostatic attraction grows stronger as the mirror is rotated near an address electrode, the memory cell contents may be changed without altering the position of the mirrors once the mirrors are fully rotated. Thus, the memory cells may be loaded with new data while the array is displaying previous data.

As should be apparent, the rotation of the individual mirror elements 21 determines the amount and quality of light that will be directed at lens 18. The light reflected from any of the mirrors may pass through a projection lens 18 in order to create images on the screen 19. The intensity of each color displayed on the screen 18 is determined by the amount of time the mirror 21 corresponding to a particular pixel directs light toward screen 31. For example, each pixel may have 256 intensity levels for each color (e.g., red, green or blue). If the color level selected for a particular pixel at a particular time is 128, then the corresponding mirror would direct light toward that area of screen 31 for ½ (e.g., 128/256) of the frame time.

Using multiple arrays of LEDs is also an option for illuminating the DMD 15 as shown in FIG. 3. FIG. 3 is a simplified configuration diagram illustrating selected components of an exemplary optical path 20. As with the example of FIG. 1, optical path 20 is part of a projection display system (although the projection lens and the display screen are not shown in FIG. 3). Exemplary optical path 20 of FIG. 3 is a "fixed array" system, having three stationary arrays; red array 28, green array 30, and blue array 32. No moving parts, such as color wheel 13 shown in FIG. 1, are needed. The light is applied sequentially by turning on and off each of the red, green, and blue arrays. One advantage of using three LED arrays rather than a single arc lamp in a projection display system is that when one LED array is on, the other two are off. This is an advantage because it means that when a given LED array is on nearly all of the light collected by the optics for illuminating the DMD is within the usable spectrum that the optics will pass to the DMD. In this way it is more efficient.

In operation, light from blue LED array 32 is transmitted via lens 33 through filter 34 and filter 35 to optical integrator 36. Likewise, light from green LED array 30 is passes through lens 31 and then is reflected from filter 34 but then transmitted through filter 35 to optical integrator 36. Light from red LED array 26 is reflected from filter 35 to optical integrator 36. Light from optical integrator 36 is transmitted to (and through) relay lenses 37 and 38, from where it is directed to DMD array 15. Light from DMD array 15 is then selectively directed to a projection lens (Not shown) and on to a screen or other display medium (also not shown).

For another example, in an arrangement that may be used in conjunction with the optical path illustrated in FIG. 3 (or a similar system), light from an array of LEDs may be collimated into a single light pipe. These LEDs may be narrow-spectrum or wide spectrum or both. LEDs emitting light at different wavelengths may also be present in the same array. One optical path for performing this function is shown in FIG.

4. Note that as used herein, the term 'optical path' may denote all of the optical components in a display system, or only a selected portion of them. Note also that while the ends of the optical path are established by the light source (or sources) and the visual image display screen, these components may also be considered a part of the optical path. FIG. 4 is a simplified representation of an optical path 40 for collimating the light emitted from a light source, in this case an array of LEDs 41. To illustrate the manipulation of the light beam by the optical-path components, in FIG. 4 (as in other Drawings), it is represented by a number of lines that are being altered by each component. This representation is for convenience, and while approximately correct, it is not meant to connote an exact light path or relative intensity.

The array of LEDs 41 is positioned so that the emitted light is in substantial part received by a convex lens 42, which reduces the light beam propagation angle significantly. A second lens 43, oriented in opposing fashion at a distance $d_1$ from the first convex lens 42, directs its light beam into light pipe 44. Light pipe 44 further collimates the light into a narrow beam that may be directed toward, for example, a DMD such as that shown in FIG. 1. Note that here, as with any optical path in a projection display system, it is important that the components in the optical path facilitate the transmission of light as efficiently as possible.

As should therefore be apparent from FIG. 4, LED array 41 may be limited in size because a substantial portion of the light emitted from it must be received by convex lens 42, wasted light energy being undesirable in display systems. In addition, the individual LEDs of LED array 41 must be positioned relatively close together. FIG. 5 is a schematic representation of an LED array 41 that might be used in conjunction with optical path 40 of FIG. 4. In the exemplary representation of FIG. 5, LED array 41 includes LEDs 51 through 56. LEDs 51 through 56 are mounted in close proximity to each other on substrate 50. Although this arrangement may produce satisfactory illumination for transmitting along optical path 40 (shown in FIG. 4), the close proximity of LEDs 51 through 56 means that the electrical power and control (data) connections may be difficult to route.

Moreover, the heat load building up on substrate 50 may be difficult to dissipate adequately. And while an LED fixed array is in some ways more efficient, however, a small amount of overlap occurs in the distribution of emitted light spectrum between, for example, the green and blue LEDs. In the optics arrangement of FIG. 3, the color filters cannot pass the overlapping colors for both the green and blue LED arrays. The "tail" of the spectrum for both green and blue is rejected by the color filters 34 and 35. But this rejection of light by the optics is not as pronounced as in a color wheel based projector using an arc lamp. So, in general, an LED fixed array based projector is less wasteful in terms of rejecting illumination source light because of its spectrum.

LED technology, however, has lagged behind arc lamp technology in being able to achieve comparable screen lumens. LED arrays can be used in a projector but not enough LEDs can fit into the limited etendue (light collection capacity) of the DMD so that acceptable screen lumens can be achieved in the marketplace. Power to each LED in any array can be increased but limitations are reached in allowable LED junction temperatures. In other words, the buildup of heat may become a problem and limit the number of LEDs that can be used in the light source array or arrays.

Needed therefore, is a display system that can efficiently produce adequate illumination for the creation of a visual image. The present invention provides just such a solution.

SUMMARY OF THE INVENTION

These and other problems are generally solved or circumvented, and technical advantages are generally achieved, by preferred embodiments of the present invention, which achieve an advantageous array of light sources such as LEDs without detracting unduly from overall system performance.

In one aspect the present invention is a method for combining dispersed light sources for use in a projection display, including the steps of integrating the light from each of the dispersed light sources in an elongated, tapered integrator, passing the light from each tapered integrator through a convex lens, and receiving the light emerging from each of the convex lenses at a first array integrator. The light passing through the first array integrator is then received at a second, effectively identical array integrator. In a preferred embodiment, the first and second array integrators are fly-eye integrators each having a plurality of integrally-formed, adjoining lenslets. Light passing the second array integrator is then received at a relay lens, or series of relay lenses that allow the light to pass to a modulating device; the light is then modulated to produce an image and transmitted through a projection lens to a visual image display screen.

In another aspect, the present invention is a system for displaying an image, including at least one light source, a display screen, and an optical path extending between them, the optical path including a light source integrator associated with each light source present. The light source integrators are preferably elongated and where, as is preferred, there are a plurality of them, are parallel with respect to their longitudinal axes. The light source integrators are disposed in an array adjoining each other. A convex lens is disposed at the end of each of the light source integrators to collimate the light emerging from it before the light falls on a first array integrator positioned beyond the output end of the light source integrator array. From the first array integrator, which is preferably a fly-eye array integrator, the light passes to a second array integrator. At least one relay lens is positioned to receive the light from the second array integrator and allow it to pass to a modulating device such as a DMD. A projection lens is disposed to receive the modulated light and focus it appropriately upon the display screen for display.

An advantage of a preferred embodiment of the present invention is that it improves efficiency by manipulating the light cones exiting the tapered array to maximize transmission through the fly-eye lenses.

A further advantage of a preferred embodiment of the present invention is that multiple light sources, such as LEDs, may be used without having to place them close together on a substrate, greatly simplifying power attachments, cooling, and placement.

A more complete appreciation of the present invention and the scope thereof can be obtained from the accompanying drawings that are briefly summarized below, the following detailed description of the presently-preferred embodiments of the present invention, and the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
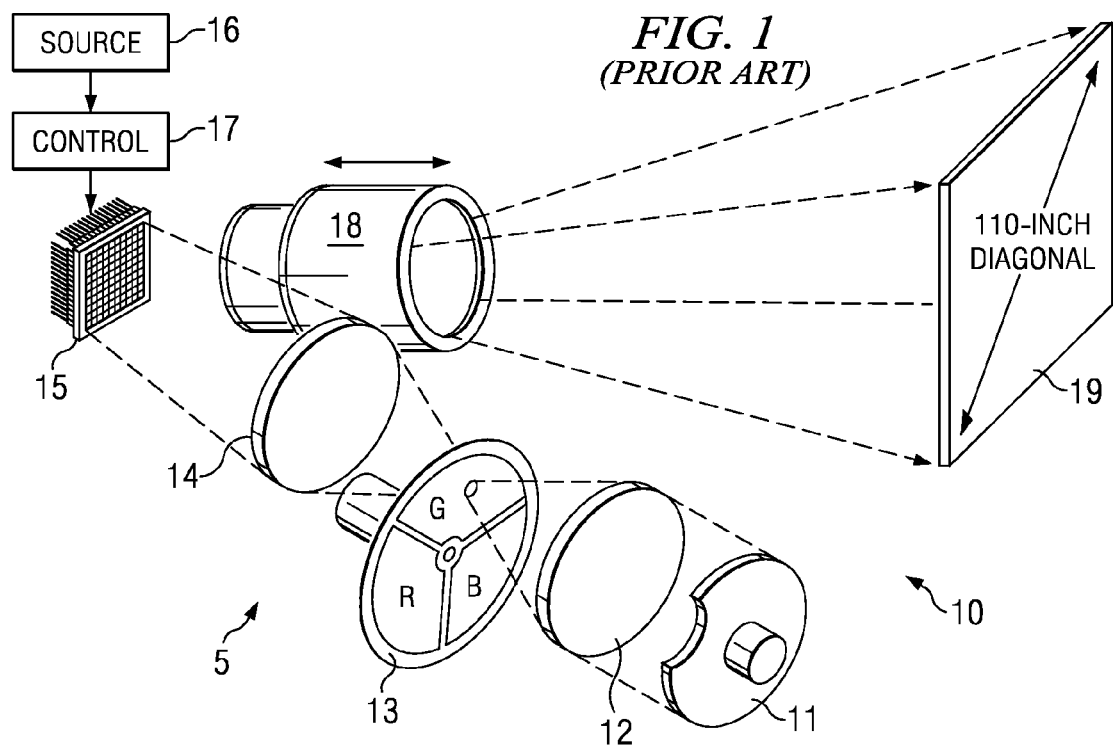
FIG. 1 is a simplified configuration diagram illustrating selected components of an exemplary projection display system.
Figure 2:
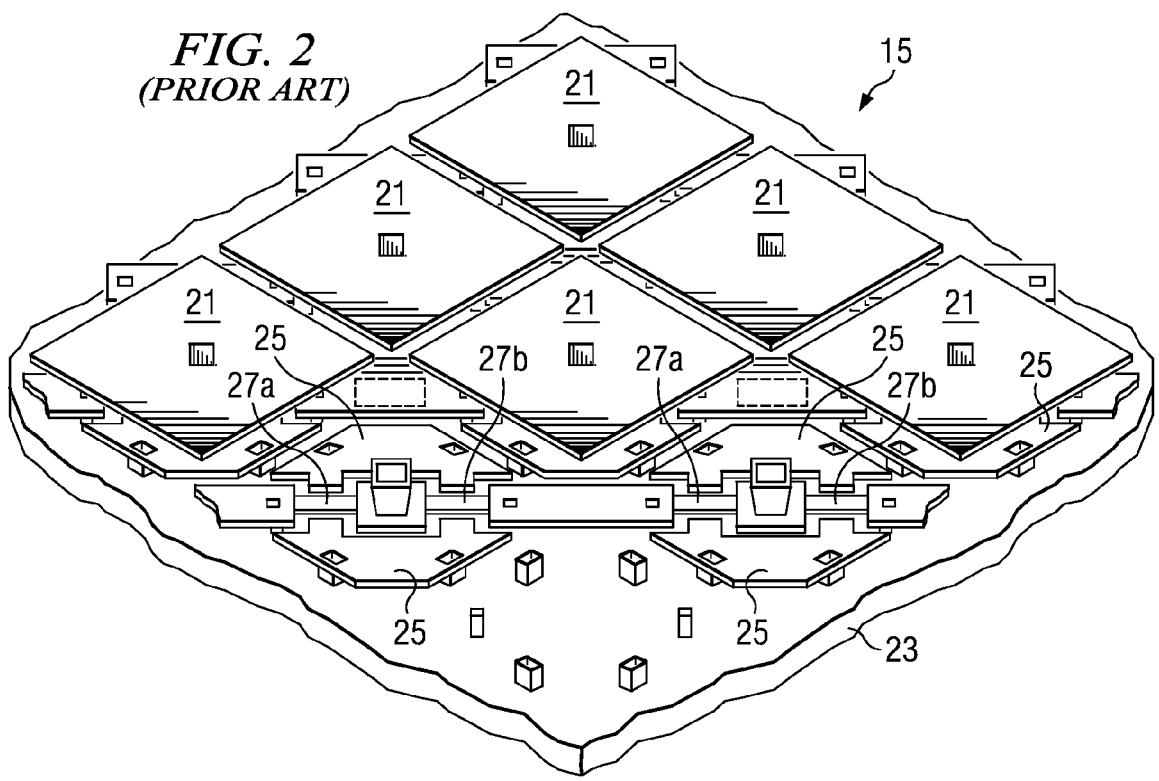
FIG. 2 shows a portion of a typical DMD chip having mirror elements suspended over a substrate.
Figure 3:
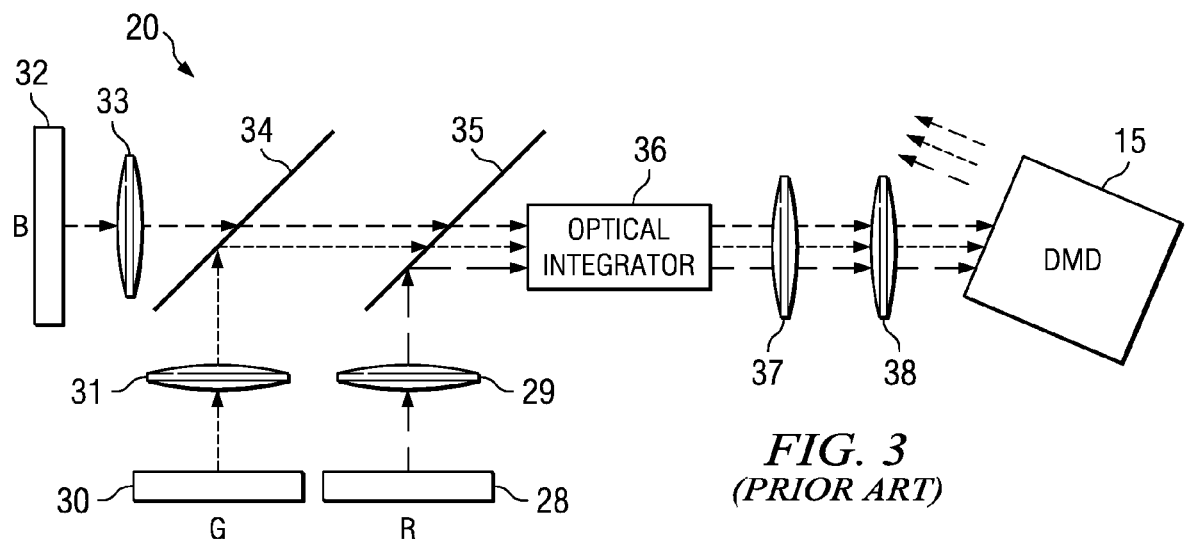
FIG. 3 is a simplified configuration diagram illustrating selected components of an exemplary optical path.
Figure 4:
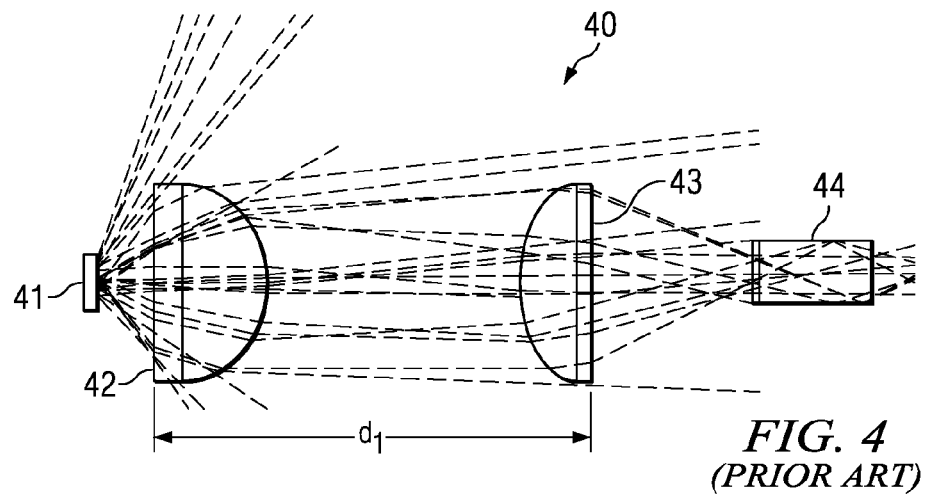
FIG. 4 is a simplified representation of an optical path for collimating the light emitted from a light source, in this case an array of LEDs.
Figure 5:
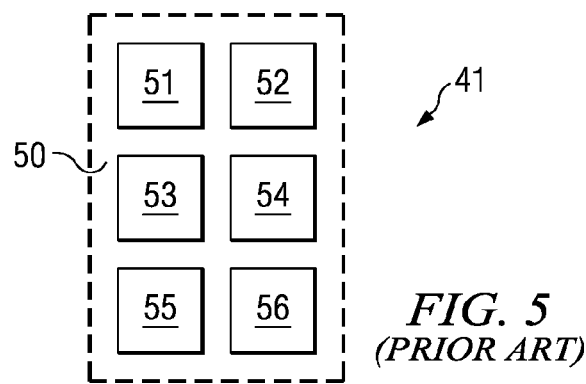
FIG. 5 is a schematic representation of an LED array that might be used in conjunction with the optical path of FIG. 4.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention is directed to a method and system advantageously employed for optically combining the light emitted by dispersed light sources, such as multiple LEDs, used in a projection display system. The display system may, for example, produce visual images for a television or high-definition television (HDTV). While preferred embodiments of the present invention will herein be described with respect to such an application, other applications are possible. Any reference to a specific application such an HDTV is therefore intended to be exemplary and not limiting. The invention may also be applied, for example, in other devices having a visual-image display screen.

As mentioned above, a projection display system generally includes a light source, a visual image display screen, and an optical path. The optical path includes and is defined by a variety of lenses and other optical devices that alter, modulate, or direct a light beam or beams emitted by the light source in order to produce a visual image on the display screen. The quality, efficiency and cost of the projection display system is determined in large part by how the light source and the optical-path components are selected and arranged. That is, by how well the light is transmitted along the optical path from the light source to the display screen.

In a preferred embodiment of the present invention, the light source is at least one light emitting diode (LED), and preferably is a plurality of LEDs. Each LED is typically mounted on an individual die and includes connections for supplying power and for controlling its operation. Note that herein the term 'light source' may include more than one LED even if the individual LEDs function independently of each other, as is frequently the case. Each LED die is in turn mounted on a substrate. As alluded to above, when multiple LEDs are used as a light source, their arrangement on the substrate is an important consideration. The method and system of the present invention supports use of an advantageous LED arrangement, namely, one in which the LEDs may be mounted in a spaced-apart (that is, dispersed) configuration. Note that for convenience, an LED mounted on a die may simply be referred to as an "LED".

In addition, although LEDs may be used as a light source for different types of display systems, in a preferred embodiment of the present invention the optical path includes a DMD array, such as the one described above. Again, however, this embodiment is exemplary and not limiting; other embodiments are possible as well. A preferred embodiment of the present invention will now be described in greater detail.

In accordance with this preferred embodiment, the present invention includes a light source and an optical path for use in a display projection system. The light source includes a plurality of LEDs, that is, a plurality of LED dice that are mounted on a substrate in a spaced-apart relationship (see FIG. 10). The precise spacing between the individual dice in this embodiment is directly determined in part by the shape and arrangement of the optical path components, but design of the system should take into account the ability of the substrate to dissipate excess heat and the relative ease of routing power and control connections. In a preferred embodiment, each LED emits light that first passes though an integrator associated with the individual LED. For convenience this device will be referred to as a light-source integrator. In other embodiments, more than one LED (though presumably a relatively small number) may in fact be associated with one light-source integrator, but this arrangement is not preferred.

Figure 6A:
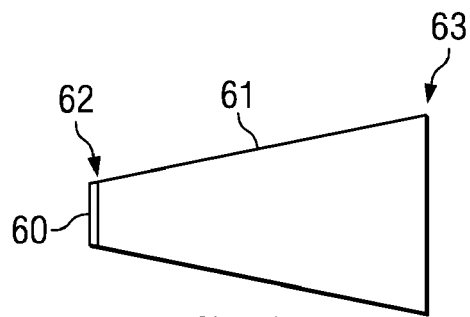
FIGS. 6a and 6b are respectively a side view and an end view of a light source integrator, disposed according to an embodiment of the present invention.
Figure 6B:
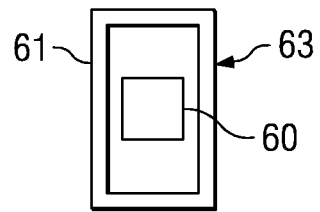

To clearly illustrate this embodiment, a single light source and single light-source integrator will first be described. FIGS. 6a and 6b are respectively a side view and an end view of a light source integrator 61, disposed according to an embodiment of the present invention. Although only one LED and its associated integrator is illustrated, there are usually many present (although no particular number is preferred.). The LED 60 will typically emit light that propagates so as to produce a cone of light rays spread across an angle of approximately 90 degrees. In this embodiment, the light-source integrator 61 is used to convert this angle through internal reflection to an angle of approximately 10 degrees. An elongated, preferably tapered integrator has been found suitable for this function. The taper of the integrator 61 creates a small end 62 and a large end 63. The die-mounted LED 60 is positioned at the small end 62. The tapered integrator is preferably asymmetrical, in this embodiment rectangular in shape when viewed from either end, as can be seen in FIG. 6b.

Note that the relative proportions of light source integrator 61 may vary from the example of FIGS. 6a and 6b. In general, however, the elongated rectangular tapered integrator is preferred because it has been found that this shape is efficient for etendue conversion. Geometric etendue G is the geometric capability of an optical system to convey radiation, in essence, the system throughput. If A is the area of emitting source (or other area at which light is accepted) and $\Omega$ is the solid angle at which the light is propagating, the geometric etendue may be expressed as: $G = \int \int dA\, d\Omega$. Etendue conversion then is the process affecting the light as the system geometry changes. This is preferably done as efficiently as possible.

Lossless etendue conversion fits the equation: $\sin^2(\theta_i)\Omega_i=\sin^2(\theta_o)\Omega_o$, where $\theta i$ and $\theta o$ represent the half angle of the light cone of the integrator input and output, respectively, and $\Omega$ is the solid angle, which is roughly equivalent to $\sin^2(\theta)$ for relatively small angles of $\theta$. The lossless etendue equation comes closer to being satisfied as the length of the integrator light pipe approaches infinity. For non-ideal applications, placing a convex lens at the integrator output helps to simulate the effect of an infinitely long integrator pipe and promotes the near lossless etendue conversion desirable for use with the present invention. This configuration is shown in FIG. 7.

Figure 7:
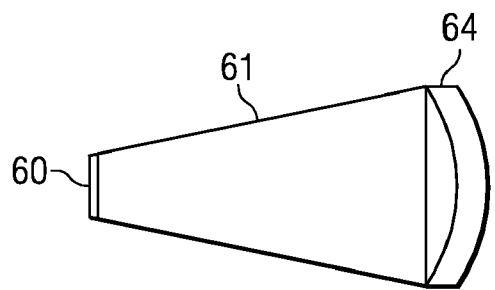
FIG. 7 is a side view of a light source integrator having a convex lens disposed at its large end.
Figure 8:
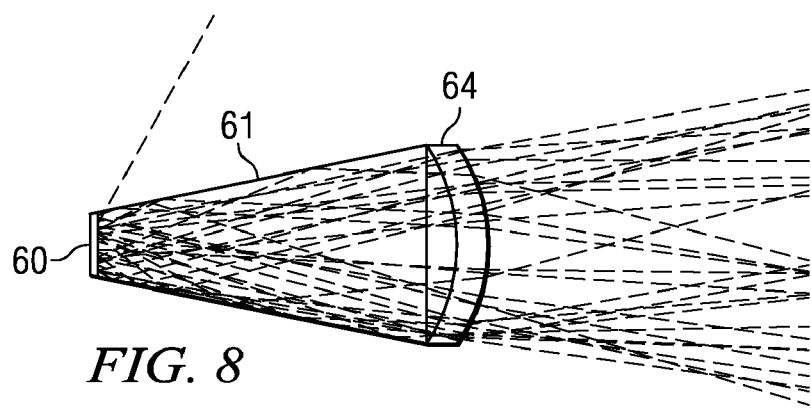
FIG. 8 is a representational side view of a light source integrator and convex lens illustrating the approximate path that light emitted by LED takes as it passes through this portion of the optical path.

FIG. 7 is a side view of light source integrator 61 having a convex lens 64 disposed at its large end 63. In a preferred embodiment, the convex lens 64 is spherical in shape, although other, aspherical shapes may be used as well. Light emitted by LED 60 passes though light source integrator 61 and then convex lens 64. Ideally, the beam of light emerging from the convex lens 64 is very nearly collimated, as illustrated in FIG. 8. FIG. 8 is a representational side view of light source integrator 61 and convex lens 64 illustrating the approximate path that light emitted by LED 60 takes as it passes through this portion of the optical path. In this way, the light produced by a single source such as an LED may be channeled for efficient use in the projection display system.

The angular content of the light exiting the tapered light source integrator is dependent on the ratio of the areas of the exit and entrance faces. If the input end is square (all faces the same size) and the output end is non-square, the angular distribution of the light exiting the source integrator will have a larger value in one dimension. For instance, if the input is square, but the output end has a 2:1 aspect ratio with the horizontal dimension being twice as large as the vertical dimension, then the angular distribution is approximately twice as large in the vertical direction than in the horizontal direction. This property is key for maximizing efficient light collection using the fly-eye integrator lenses.

Figures 9, 10:
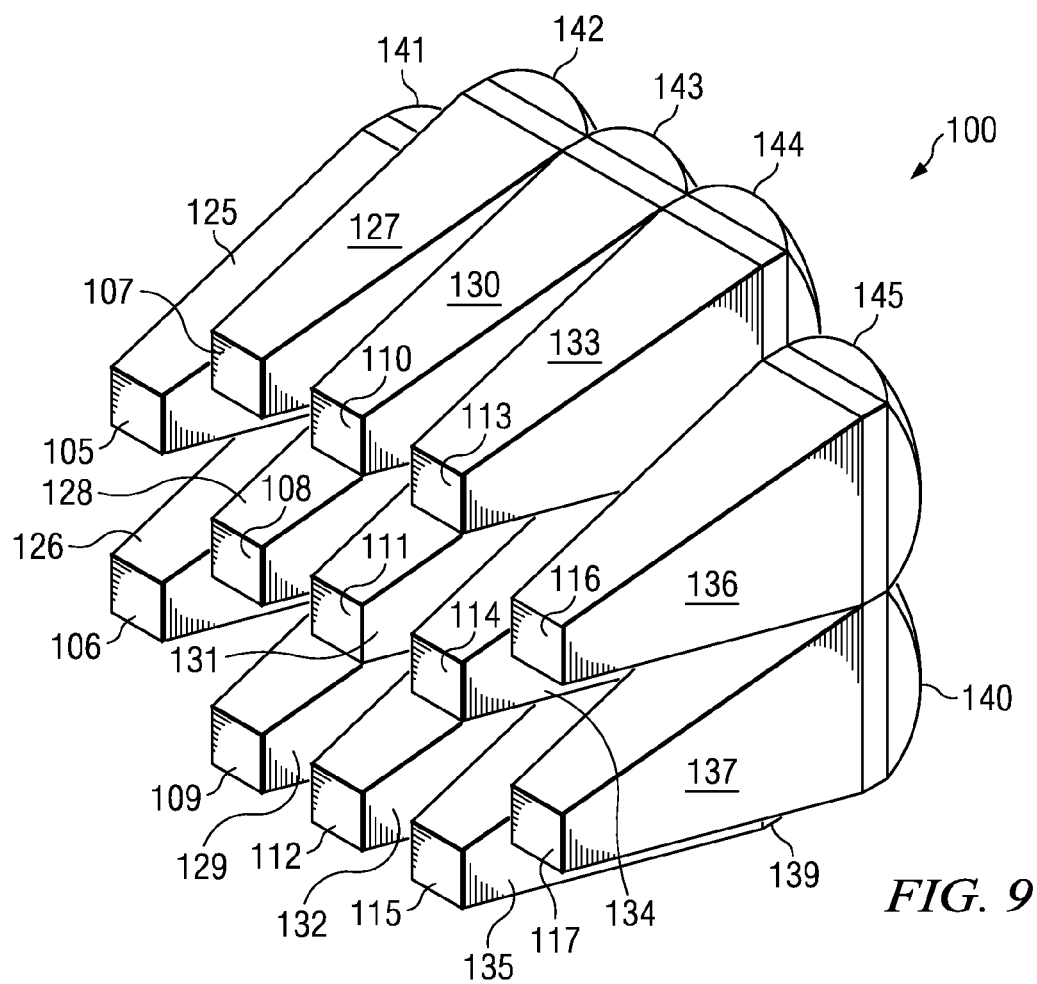
FIG. 9 is a perspective view of a light source integrator array configured according to an embodiment of the present invention.
FIG. 10 is a schematic drawing illustrating in plan view the LED layout that corresponds with the array configuration of the embodiment of FIG. 9.

LED 60 may be the only light source in the display system. In a preferred embodiment, however, more than one LED light source will be used. The tapered integrator and convex lens of FIG. 7 may be employed advantageously in such a scenario. FIG. 9 is a perspective view of a light source integrator array 100 configured according to an embodiment of the present invention. In this embodiment, array 100 includes LEDs 105 through 117, each of which is uniquely associated with an elongated integrator (numbered respectively 125 through 137). In this embodiment, all of the tapered integrators 125 though 137 are substantially identical, which is preferred though not required. For clarity, only integrator 137 is labeled with reference numbers indicating a small end 138 and a large end 139. The remainder of the light source integrators are identical, or at least similarly configured to integrator 137.

Disposed adjacent large end 139 of integrator 137 is convex lens 140, the purpose of which is described above in reference to FIG. 8. In FIG. 9, convex lenses 141 though 145 are also visible (there is, however, in this embodiment a convex lens associated with each light source integrator). Note that in this preferred embodiment, each of the integrators 125 through 137 are tapered, and their larger ends are disposed immediately or nearly adjacent to each other. Integrators 125 through 137 are each elongated, defining a longitudinal axis. In the embodiment of FIG. 9, the longitudinal axes of the light source integrators are parallel with respect to each other. The output of the array 100 therefore approximates a single beam of light, notwithstanding the fact that the light sources themselves, namely LEDs 105 though 117, are disposed in a spaced apart relationship with respect to each other. In this embodiment, the LEDs are also all disposed in substantially the same plane. In other embodiments, this may not be the case. The spacing between the LEDs is essentially permitted the shape and disposition of the integrators 125 though 137 of array 100.

The non-adjacent disposition of LEDs 105 through 117 provides an important benefit. In practice, the LEDs are typically mounted on a substrate. FIG. 10 is a schematic drawing illustrating in plan view the LED layout that corresponds with the embodiment of FIG. 9. As can be seen in FIG. 10, LEDs 105 though 117 are mounted on substrate 150 in a spaced apart relationship with respect to each other. As used in this context, "spaced apart" means not immediately or nearly adjacent to each other. This configuration, made feasible through employment of the present invention, allows ample area for routing electrical connections and avoids the heat buildup problems that may occur if the LEDs are positioned too closely to each other. The substrate 150 preferably functions as or is conductively coupled with a heat sink that also tends to prevent undesirable heat accumulation.

Figure 11:
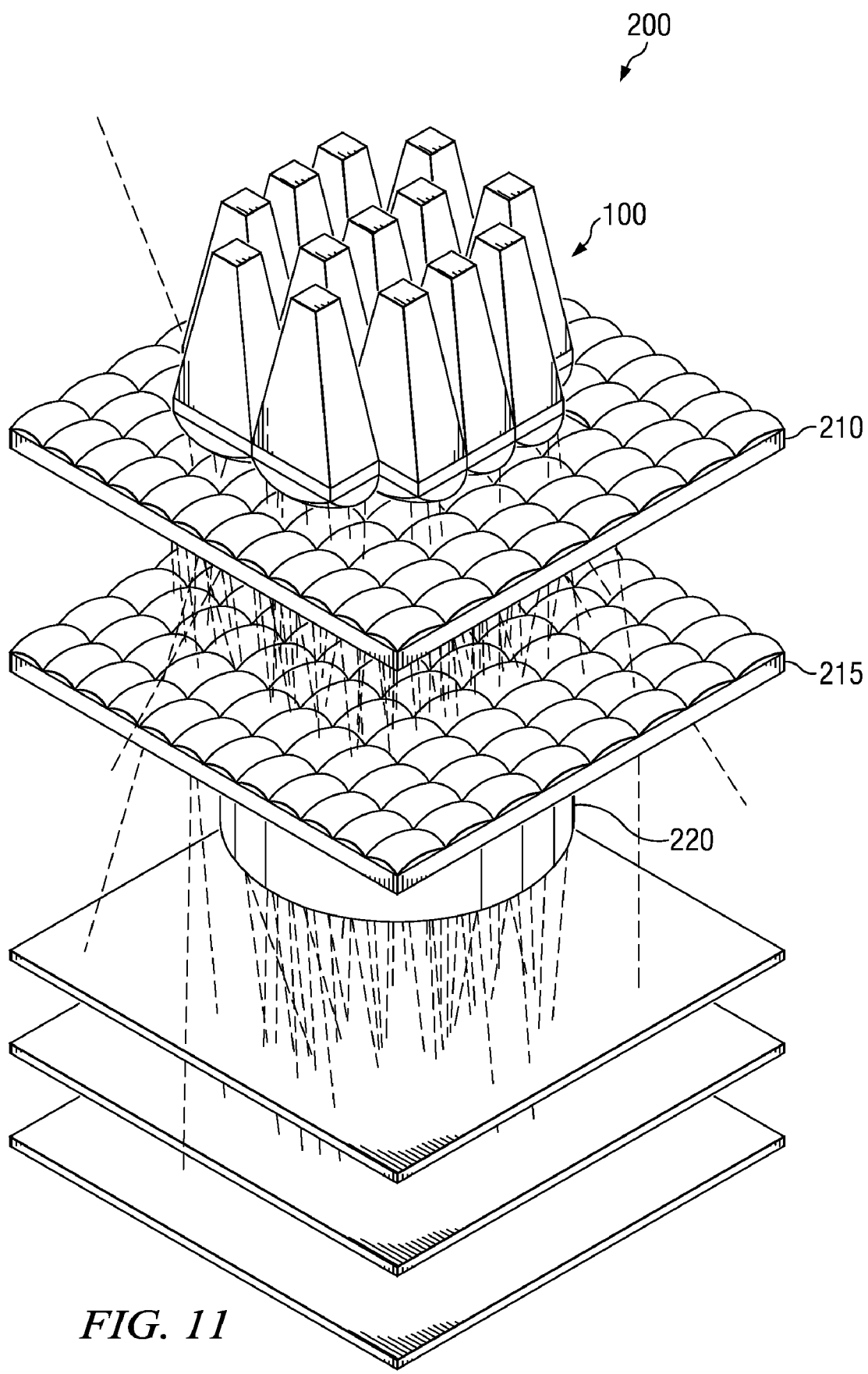
FIG. 11 is a perspective view of an optical path according to an embodiment of the present invention.

The light produced by the LEDs 105 thorough 117 and channeled though respective integrators 125 though 137, and the convex lenses individually associated with each of them, is then processed by a first array integrator and, preferably a second array integrator as well. FIG. 11 is a perspective view of an optical path 200 according to an embodiment of the present invention. Optical path 200 includes light source integrator array 100 (separately shown in FIG. 9), and additional optical components as well. Light source integrator array 100 includes LEDs 105 through 117, and their associated light source integrators and convex lenses (which for clarity are not separately enumerated in FIG. 11). Disposed proximate the convex lenses at the end of the elongated integrators is a first lens-array integrator 210. Array integrator 210 is an array of lenses that receive the light initially emitted from LEDs 105 though 117 after it has passed through light source integrator array 100.

First array integrator 210 is preferably a fly-eye integrator, as shown in FIG. 11. It is preferably an integrally formed array of lenses (sometimes in this context referred to as lenslets, each being disposed in the same plane. Separate lenses or groups of lenses formed into a similar structure may also be used, but such a configuration is not preferred. The number of facets, or lenslets forming the array may vary, though an array of 100 facets arranged in a 10 by 10 array might be considered typical. Simulation or model testing may be performed to optimize the number of facets or other characteristics of the array integrator 210. The first lens array integrator, however, preferably has an aspect ratio identical or at least similar to that of the display-system DMD (not shown in FIG. 11) because it is a chief determiner of the shape of the illumination spot. Note that in this embodiment, the lenslets are rectangular in shape (when viewed from the perspective of the array 100). This rectangular shape of the lenslets, of course, helps to define the aspect ration of the array.

As mentioned above, the projection display system preferably includes a second array integrator as well. Referring to FIG. 11, array integrator 215 receives light after it passes through first array integrator 210. Although it is not required, the two array integrators are typically effectively identical, or nearly so. (By "effectively identical" it is meant that the integrators are the same over their light accepting regions, ignoring difference in mounting or border regions.) In this case, it is preferred that the light beam entering the lens array of the second array integrator 215 have a non-symmetrical angular distribution. For example, an HDTV image display screen may have an aspect ratio of 16:9. In this case, the angular distribution for light entering the second array integrator should have a cone angle of 4.5 degrees by 8 degrees, with the smaller angle oriented in the same direction as the small dimension of the second array integrator. In this way, the spots formed by the first array integrator 210 correspond to the shape of the second array integrator 215. This configuration wastes a minimum amount of light, since any light from the first array integrator 210 that falls on more than one facet (lenslet) of the second array integrator 215 is lost.

Light passing through array integrator 215 is then received at relay lens 220. From relay lens 220 the light is then directed toward the DMD (not shown in FIG. 7). Optical components other than those illustrated in FIG. 11 may, of course, be present but are not described here in detail. Note, however, that the focal length of the relay lenses following the second array integrator 215 determine the magnification of the fly-eyes and the f-number of the illumination on the DMD. The f-number may be lowered by increasing the number of LEDs or the spacing between them, for example, by increasing the output (large) end of the elongated light source integrators. The f-number of the relay lenses may, of course, also be reduced by reducing the focal length in the relay optics. Generally speaking, these parameter adjustments may be made without affecting the relative etendue of the LEDs and the DMD.

Figure 12:
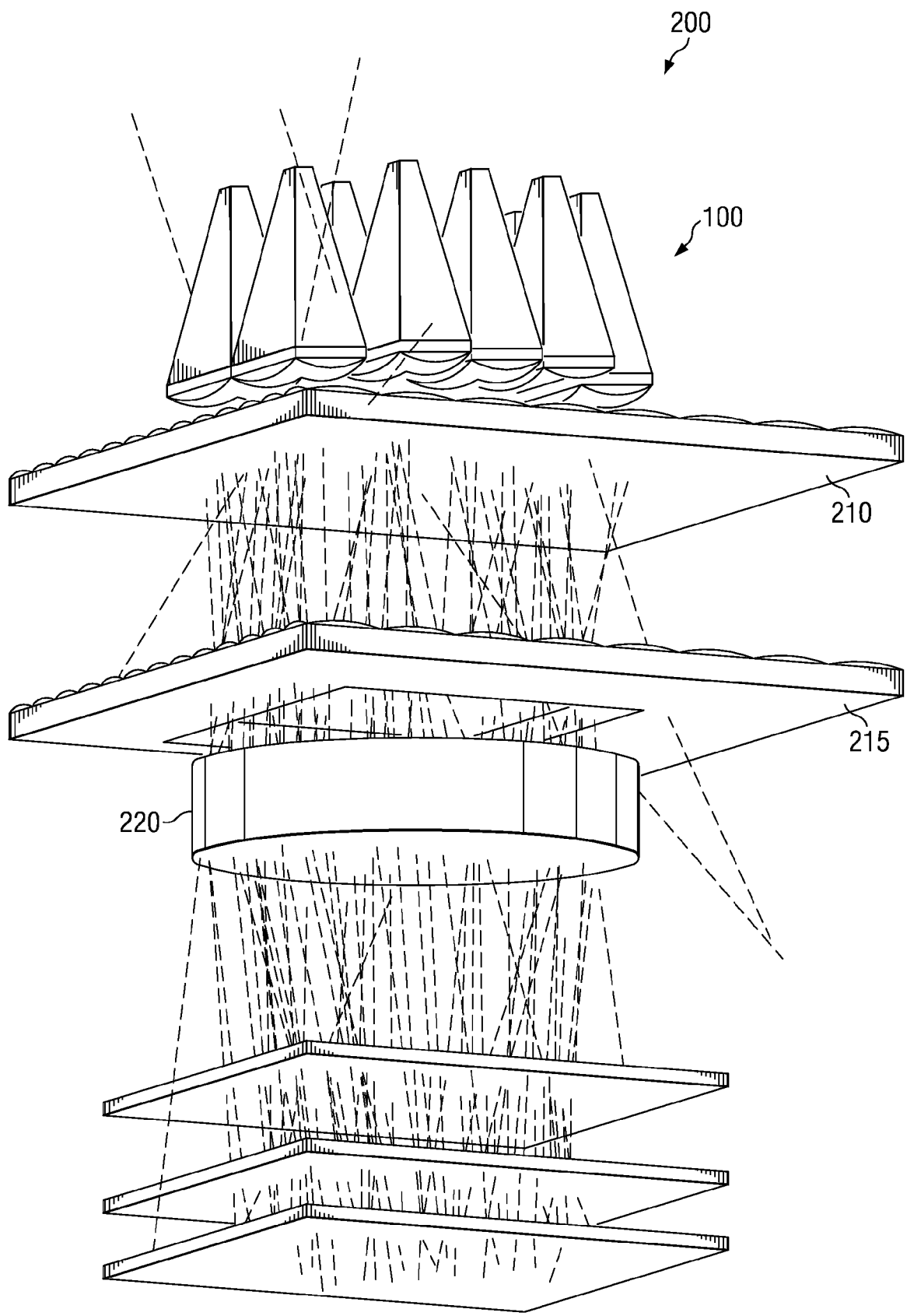
FIG. 12 is a perspective view of the optical path of FIG. 11 according to an embodiment of the present invention, view from a different reference point.

FIG. 12 is a perspective view of the optical path 200 of FIG. 11 according to an embodiment of the present invention. From this perspective, it may more clearly be seen that the lines representing the beam of light passing though optical path 200 are substantially collimated when they enter relay lens 220.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof. As another example, it will be readily understood by those skilled in the art that the shape of the integrators may be varied while remaining within the scope of the present invention.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for combining light from a plurality of dispersed sources, said method comprising the steps of:

integrating the light emitted by each light source in the plurality of light sources in an elongated light source integrator having an input end and an output end;

providing a convex lens at the output end of each light source integrator for collimating an emergent light beam;

receiving the light collimated by the convex lenses at a first array integrator, wherein the light collimated by the convex lenses is always directed towards the first array integrator; and receiving the light passing through the first array integrator at a second array integrator.

2. The method according to claim 1, further comprising the steps of:

modulating the light passing through the second array integrator to form a visual image; and displaying the visual image on a display screen.

3. The method according to claim 2, wherein the modulating step is performed by a digital mirromirror device (DMD).

4. The method according to claim 2, wherein the modulated light passes through a projection lens prior to the displaying step.

5. The method according to claim 2, wherein the light passing through the second array integrator passes through at least one relay lens prior to the modulating step.

6. The method according to claim 1, wherein the first array integrator and the second array integrator are both fly-eye integrators.

7. The method according to claim 6, wherein the first array integrator and the second array integrator are effectively identical.

8. The method according to claim 7, wherein each of the fly-eye integrators comprise a plurality of rectangular facets.

9. The method according to claim 8, wherein each of the light source integrators is tapered, with the output being at the larger end.

10. The method according to claim 9, wherein the light source integrators are rectangular.

11. A display system comprising:

a plurality of light sources aligned in a same plane;

an array of light-source integrators, each light-source integrator of the array for receiving light emitted from one light source of the plurality of light sources;

a plurality of convex lenses, each convex lens being positioned to receive light emitted by a light source after it has passed through the light-source integrator associated with the light source;

a first array integrator positioned to receive light passing through the plurality of convex lenses;

a plurality of light paths between the convex lenses and the first array integrator, each of the plurality of light paths being substantially the same length;

a second array integrator positioned to receive light passing through the first array integrator;

a relay lens positioned to receive light passing through the second array integrator;

a light modulation device to modulate light passing through the relay lens;

a projection lens for receiving light modulated by the light modulation device; and a visual image display screen for receiving light projected by the projection lens in order to create a visual image.

12. The display system of claim 11, wherein the light sources are arc lamps.

13. The display system of claim 11 wherein the light sources are LEDs.

14. The display system of claim 13, wherein the LED's are mounted on a substrate.

15. The display system of claim 11, wherein the light source integrators comprise a small end and a large end, and are adjacent to each other at the large end.

* * * * *